United States Patent
Mizrahi et al.

(10) Patent No.: US 10,296,346 B2
(45) Date of Patent: *May 21, 2019

(54) PARALLELIZED EXECUTION OF INSTRUCTION SEQUENCES BASED ON PRE-MONITORING

(71) Applicant: CENTIPEDE SEMI LTD., Netanya (IL)

(72) Inventors: Noam Mizrahi, Hod Hasharon (IL); Alberto Mandler, Zichron Yaakov (IL); Shay Koren, Tel-Aviv (IL); Jonathan Friedmann, Even Yehuda (IL)

(73) Assignee: CENTIPEDE SEMI LTD., Netanya (IL)

( * ) Notice: Subject to any disclaimer, the term of this patent is extended or adjusted under 35 U.S.C. 154(b) by 202 days.

This patent is subject to a terminal disclaimer.

(21) Appl. No.: 14/673,884

(22) Filed: Mar. 31, 2015

(65) Prior Publication Data

US 2016/0291982 A1 Oct. 6, 2016

(51) Int. Cl.
*G06F 9/38* (2018.01)
*G06F 9/46* (2006.01)

(52) U.S. Cl.
CPC .......... *G06F 9/3808* (2013.01); *G06F 9/3838* (2013.01); *G06F 9/3851* (2013.01); *G06F 9/3857* (2013.01); *G06F 9/46* (2013.01)

(58) Field of Classification Search
CPC .. G06F 9/3851; G06F 9/3838; G06F 9/30065; G06F 9/3808; G06F 9/5083; G06F 9/3009; G06F 9/381; G06F 9/3818; G06F 9/3804; G06F 9/382

See application file for complete search history.

(56) References Cited

U.S. PATENT DOCUMENTS

| | | |
|---|---|---|
| 4,991,080 A | 2/1991 | Emma et al. |
| 5,394,529 A | 2/1995 | Brown, III et al. |
| 5,488,729 A | 1/1996 | Vegesna et al. |
| 5,488,730 A | 1/1996 | Brown, III et al. |

(Continued)

FOREIGN PATENT DOCUMENTS

| | | |
|---|---|---|
| CN | 101847094 A | 9/2010 |
| EP | 2239657 B1 | 11/2012 |
| EP | 2778907 A2 | 9/2014 |
| GB | 2448118 A | 10/2008 |
| WO | 0193029 A2 | 12/2001 |

OTHER PUBLICATIONS

U.S. Appl. No. 14/690,424 Office Action dated Aug. 27, 2015.

(Continued)

*Primary Examiner* — Eric Coleman
(74) *Attorney, Agent, or Firm* — Kligler & Associates

(57) ABSTRACT

A method which includes, in a processor that processes instructions of program code, processing one or more of the instructions in a first segment of the instructions by a first hardware thread. Upon detecting that an instruction defined as a parallelization point has been fetched for the first thread, a second hardware thread is invoked to process at least one of the instructions in a second segment of the instructions, at least partially in parallel with processing of the instructions of the first segment by the first hardware thread, in accordance with a specification of register access that is indicative of data dependencies between the first and second segments.

26 Claims, 3 Drawing Sheets

(56) References Cited

U.S. PATENT DOCUMENTS

| | | |
|---|---|---|
| 5,781,752 A | 7/1998 | Moshovos et al. |
| 5,931,957 A | 8/1999 | Konigsburg et al. |
| 5,966,537 A | 10/1999 | Ravichandran |
| 5,974,538 A | 10/1999 | Wilmot, II |
| 6,035,120 A | 3/2000 | Ravichandran |
| 6,092,180 A | 7/2000 | Anderson et al. |
| 6,101,595 A | 8/2000 | Pickett et al. |
| 6,157,998 A | 12/2000 | Rupley, II et al. |
| 6,182,210 B1 | 1/2001 | Akkary et al. |
| 6,202,205 B1 | 3/2001 | Saboff et al. |
| 6,247,121 B1* | 6/2001 | Akkary ............... G06F 9/3834 712/216 |
| 6,289,442 B1 | 9/2001 | Asato |
| 6,308,175 B1 | 10/2001 | Lang et al. |
| 6,463,522 B1 | 10/2002 | Akkary |
| 6,463,523 B1 | 10/2002 | Kessler et al. |
| 6,493,820 B2 | 12/2002 | Akkary et al. |
| 6,505,345 B1 | 1/2003 | Chen et al. |
| 6,516,409 B1 | 2/2003 | Sato |
| 6,658,447 B2 | 12/2003 | Cota-Robles |
| 6,732,260 B1 | 5/2004 | Wang et al. |
| 6,772,324 B2 | 8/2004 | Akkary et al. |
| 6,826,752 B1 | 11/2004 | Thornley et al. |
| 7,065,759 B2 | 6/2006 | Hank |
| 7,134,005 B2 | 11/2006 | Henry et al. |
| 7,194,603 B2 | 3/2007 | Burky et al. |
| 7,313,675 B2 | 12/2007 | Latorre et al. |
| 7,313,676 B2 | 12/2007 | Brekelbaum et al. |
| 7,366,880 B2 | 4/2008 | Chaudry et al. |
| 7,401,329 B2 | 7/2008 | De Rijck |
| 7,434,032 B1 | 10/2008 | Coon et al. |
| 7,478,198 B2 | 1/2009 | Latorre et al. |
| 7,526,637 B2 | 4/2009 | Jung et al. |
| 7,571,302 B1 | 8/2009 | Chen et al. |
| 7,596,781 B2 | 9/2009 | Fulton et al. |
| 7,600,221 B1* | 10/2009 | Rangachari ........... G06F 9/3808 712/215 |
| 7,650,485 B1 | 1/2010 | Chou |
| 7,681,187 B2 | 3/2010 | Ludwig et al. |
| 7,779,069 B2 | 8/2010 | Frid-Nielsen et al. |
| 7,840,954 B2 | 11/2010 | Gschwind |
| 7,882,381 B2 | 2/2011 | Wyatt |
| 8,006,235 B2 | 8/2011 | Broman et al. |
| 8,056,061 B2 | 11/2011 | Lee et al. |
| 8,082,423 B2 | 12/2011 | Abernathy et al. |
| 8,166,467 B2 | 4/2012 | Biswas et al. |
| 8,181,170 B2 | 5/2012 | Patil et al. |
| 8,185,882 B2 | 5/2012 | Patel et al. |
| 8,196,117 B2 | 6/2012 | Lafrance-Linden |
| 8,230,411 B1 | 7/2012 | Vorbach et al. |
| 8,261,046 B2 | 9/2012 | Gilbert et al. |
| 8,291,197 B2 | 10/2012 | Wu et al. |
| 8,392,651 B2 | 3/2013 | Mylavarapu et al. |
| 8,402,429 B2 | 3/2013 | Kielstra |
| 8,438,370 B1 | 5/2013 | Budge |
| 8,572,595 B1 | 10/2013 | Lethin et al. |
| 8,612,949 B2 | 12/2013 | Liao et al. |
| 8,667,471 B2 | 3/2014 | Wintergerst et al. |
| 8,677,337 B2 | 3/2014 | Song et al. |
| 8,719,806 B2 | 5/2014 | Wang et al. |
| 8,843,901 B2 | 9/2014 | Krajec et al. |
| 9,015,687 B2 | 4/2015 | George |
| 9,170,792 B2 | 10/2015 | Park et al. |
| 2002/0144092 A1 | 10/2002 | Topham et al. |
| 2002/0194457 A1 | 12/2002 | Akkary |
| 2003/0135711 A1* | 7/2003 | Shoemaker ........... G06F 9/3802 712/200 |
| 2003/0167460 A1 | 9/2003 | Desai et al. |
| 2004/0073781 A1* | 4/2004 | Hokenek .............. G06F 9/3851 712/235 |
| 2004/0073906 A1 | 4/2004 | Chamdani et al. |
| 2004/0098570 A1 | 5/2004 | Giri |
| 2004/0154010 A1 | 8/2004 | Marcuello et al. |
| 2004/0193857 A1 | 9/2004 | Miller et al. |
| 2005/0132376 A1 | 6/2005 | Rodgers et al. |
| 2005/0172277 A1 | 8/2005 | Chheda et al. |
| 2005/0198481 A1 | 9/2005 | Henry et al. |
| 2005/0240930 A1* | 10/2005 | Amamiya ............. G06F 9/3012 718/100 |
| 2006/0026411 A1 | 2/2006 | Yoshida |
| 2006/0047495 A1 | 3/2006 | Sanchez et al. |
| 2006/0095732 A1 | 5/2006 | Tran et al. |
| 2006/0174237 A1* | 8/2006 | Granston ............. G06F 8/4452 717/161 |
| 2006/0227966 A1 | 10/2006 | Knowles |
| 2007/0043531 A1 | 2/2007 | Kosche et al. |
| 2008/0134196 A1 | 6/2008 | Madriles et al. |
| 2008/0162272 A1 | 7/2008 | Huang et al. |
| 2008/0163230 A1 | 7/2008 | Latorre et al. |
| 2008/0167846 A1 | 7/2008 | Bugenhagen |
| 2008/0195847 A1* | 8/2008 | Wu ..................... G06F 9/30043 712/216 |
| 2008/0307403 A1 | 12/2008 | Heishi |
| 2008/0320276 A1 | 12/2008 | Krottendorfer et al. |
| 2009/0063823 A1 | 3/2009 | Burky et al. |
| 2009/0077545 A1* | 3/2009 | Silvera .................. G06F 8/443 717/160 |
| 2009/0106495 A1 | 4/2009 | Chou |
| 2009/0138690 A1 | 5/2009 | Luick |
| 2009/0172362 A1 | 7/2009 | Shen et al. |
| 2009/0228690 A1 | 9/2009 | Muff et al. |
| 2009/0235237 A1* | 9/2009 | Song ..................... G06F 8/456 717/132 |
| 2009/0327674 A1 | 12/2009 | Codrescu et al. |
| 2010/0161948 A1 | 6/2010 | Abdallah |
| 2010/0262807 A1 | 10/2010 | Burky et al. |
| 2010/0269102 A1* | 10/2010 | Latorre ................ G06F 9/3842 717/130 |
| 2010/0299657 A1* | 11/2010 | Barua ................... G06F 8/456 717/136 |
| 2011/0055484 A1 | 3/2011 | Eichenberger et al. |
| 2011/0067014 A1* | 3/2011 | Song ..................... G06F 8/456 717/149 |
| 2011/0107071 A1 | 5/2011 | Jacob |
| 2011/0161643 A1 | 6/2011 | Eichenberger et al. |
| 2011/0167247 A1 | 7/2011 | Gibbs et al. |
| 2011/0265067 A1* | 10/2011 | Schulte .................. G06F 8/456 717/148 |
| 2011/0320787 A1 | 12/2011 | Dieffenderfer et al. |
| 2012/0023316 A1 | 1/2012 | Flachs et al. |
| 2012/0079146 A1 | 3/2012 | Hesse |
| 2012/0151463 A1* | 6/2012 | Kalogeropulos ....... G06F 8/452 717/160 |
| 2013/0091340 A1 | 4/2013 | Abdallah |
| 2013/0125097 A1 | 5/2013 | Ebcioglu et al. |
| 2013/0166886 A1* | 6/2013 | Sasanka ............. G06F 9/30098 712/216 |
| 2013/0232476 A1 | 9/2013 | Varma et al. |
| 2014/0019726 A1 | 1/2014 | Toi et al. |
| 2014/0215187 A1 | 7/2014 | Yazdani |
| 2014/0244976 A1* | 8/2014 | Sundar ............... G06F 9/30054 712/213 |
| 2014/0281435 A1 | 9/2014 | Perkins et al. |
| 2014/0282592 A1 | 9/2014 | Abdallah |
| 2014/0282601 A1 | 9/2014 | Abdallah |
| 2014/0317380 A1* | 10/2014 | Yamamoto ........... G06F 9/3867 712/30 |
| 2014/0317387 A1 | 10/2014 | Abdallah |
| 2015/0220341 A1 | 8/2015 | Onannessian |
| 2016/0011869 A1 | 1/2016 | Jackson |
| 2016/0179549 A1* | 6/2016 | Xekalakis ............ G06F 9/3818 712/208 |
| 2016/0357529 A1* | 12/2016 | Tsujimori ............... G06F 8/452 |
| 2017/0010894 A1* | 1/2017 | Nalluri ............... G06F 9/30094 |

OTHER PUBLICATIONS

Mishra at al., "Specification-driven Directed Test Generation for Validation of Pipelined Processors", ACM Transactions on Design Automation of Electronic Systems, vol. 13, No. 3, article 42, pp. 42:1-42:36, Jul. 2008.

(56) References Cited

OTHER PUBLICATIONS

Rosner et al., "Power Awareness through Selective Dynamically Optimized Traces", Proceedings of the 31st annual international symposium on computer architecture, vol. 32, issue 2, 12 pages, Mar. 2004.
Sami et al., "Exploiting data forwarding to reduce the power budget of VLIW embedded processors", IEEE Proceedings of the Conference on Design, Automation and Test in Europe, Munich, Germany, pp. 252-257, Mar. 13-16, 2001.
Lazarescu et al., "Dynamic Trace-Based Data Dependency Analysis for Parallelization of C Programs", 2012 IEEE 12th International Working Conference on Source Code Analysis and Manipulation (SCAM), pp. 126-131, Sep. 23-24, 2012.
U.S. Appl. No. 14/690,424 Office Action dated Dec. 9, 2015.
International Application # PCT/IB2015/059468 Search Report dated Apr. 7, 2016.
International Application # PCT/IB2015/059469 Search Report dated Mar. 31, 2016.
International Application # PCT/IB2015/059467 Search Report dated Apr. 12, 2016.
International Application # PCT/IB2015/059470 Search Report dated Mar. 29, 2016.
International Application # PCT/IB2016/050562 Search Report dated May 11, 2016.
U.S. Appl. No. 14/637,418 Office Action dated May 28, 2015.
Moseley et al., "Identifying potential parallelism via loop-centric profiling", ACM, 9 pages, May 7-9, 2007.
U.S. Appl. No. 14/578,518 Office Action dated Jun. 19, 2015.
Ortiz-Arroyo et al., "Dynamic Simultaneous Multithreaded Architecture", Proceedings of ISCA's 16th International Conference on Parallel and Distributed Computing Systems (PDCS'03), 9 pages, year 2003.
Ortiz-Arroyo, D.,"Efficient Resource Allocation on a Dynamic Simultaneous Multithreaded Architecture", Computer Science and Engineering Department, Aalborg University, Denmark, 5 pages, year 2006.
Marcuello et al., "A Quantitative Assessment of Thread-Level Speculation Techniques", Proceedings of the 14th International Parallel and Distributed Processing Symposium, pp. 595-601, May 1-5, 2000.
Marcuello et al., "Thread-Spawning Schemes for Speculative Multithreading", Proceedings of the Eighth International Symposium on High-Performance Computer Architecture (HPC02), pp. 55-64, Feb. 2-6, 2002.
Marcuello et al., "Clustered Speculative Multithreaded Processors", Proceedings of the 13th international conference on Supercomputing (ICS '99), pp. 365-372, year 1999.
Marcuello et al., "Speculative Multithreaded Processors", Proceedings of the 12th international conference on Supercomputing (ICS '98), pp. 77-84, year 1998.
Cazorla et al., "Dynamically Controlled Resource Allocation in SMT Processors", Proceedings of the 37th International Symposium on Microarchitecture (MICRO-37'04), pp. 171-182, year 2004.
Akkary et al., "A Dynamic Multithreading Processor", Proceedings of the 31st annual ACM/IEEE international symposium on Microarchitecture (MICRO-31), pp. 226-236, Dec. 2, 1998.
Ranjan et al., "P-Slice Based Efficient Speculative Multithreading", International Conference on High Performance Computing (HiPC), pp. 119-128, Dec. 16-19, 2009.
Sohi et al., "Speculative Multithreaded Processors", IEEE Computer, vol. 34, issue 4, pp. 66-73, Apr. 2001.
Sohi et al., "Speculative Multithreaded Processors", Computer Sciences Department, University of Wisconsin-Madison, year 2001.
Roth et al., "Register Integration: A Simple and Efficient Implementation of Squash Reuse", Proceedings of the 33rd Annual International Symposium on Microarchitecture (MICRO-33), 12 pages, Dec. 10-13, 2000.
Roth, A., "Pre-Execuion via Speculative Data-Driven Multithreading", A dissertation submitted in partial fulfillment of the requirements for the degree of Doctor of Philosophy (Computer Sciences), University of Wisconsin Madison, 375 pages, year 2001.
Jacobson et al., "Path-Based Next Trace Prediction", Proceedings of Micro-30, 11 pages, Dec. 1-3, 1997.
Tubella et al., "Control Speculation in Multithreaded Processors through Dynamic Loop Detection", Proceedings of the 4th International High-Performance Computer Architecture Symposium, pp. 14-23, Feb. 1-4, 1998.
Zier et al., "Performance Evaluation of Dynamic Speculative Multithreading with the Cascadia Architecture", IEEE Transactions on Parallel and Distributed Systems, vol. 21, No. 1, pp. 47-59, Jan. 2010.
Zier, "The Dynamic Speculation and Performance Prediction of Parallel Loops", Dissertation for the degree of Doctor of Philosophy in Electrical and Computer Engineering, Oregon State University, 146 pages, May 1, 2009.
De Alba et al., "Characterization and Evaluation of Hardware Loop Unrolling", Boston Area Architecture Workshop (BARC-2003), 18 pages, Jan. 2003.
Collins et al., "Clustered Multithreaded Architectures-Pursuing Both IPC and Cycle Time", Proceedings of the 18th International Parallel and Distributed Processing Symposium, 10 pages, Apr. 2004.
Mizrahi et al., U.S. Appl. No. 14/578,518, filed Dec. 22, 2014.
Mizrahi et al., U.S. Appl. No. 14/583,119, filed Dec. 25, 2014.
Patel et al., "rePlay: A Hardware Framework for Dynamic Optimization", IEEE Transactions on Computers, vol. 50, No. 6, pp. 590-608, Jun. 2001.
Shen et al., Modern Processing Design: Fundamentals of Superscalar Processors, Chapter 4.2, pp. 159-164, 2002.
U.S. Appl. No. 14/583,119 Office Action dated Apr. 14, 2015.
Mizrahi et al., U.S. Appl. No. 14/578,516, filed Dec. 22, 2014.
Mizrahi et al., U.S. Appl. No. 14/673,889, filed Mar. 31, 2015.
Mizrahi et al., U.S. Appl. No. 14/637,418, filed Mar. 4, 2015.
Mizrahi et al., U.S. Appl. No. 14/690,424, filed Apr. 19, 2015.
U.S. Appl. No. 14/578,516 Office Action dated May 21, 2015.
U.S. Appl. No. 14/583,119 Office Action dated May 28, 2015.
International Application # PCT/IB2017/056057 search report dated Jan. 9, 2018.
European Application # 17188441.4 search report dated Mar. 7, 2018.
International Application # PCT/IB2017/057122 search report dated Mar. 8, 2018.
U.S. Appl. No. 14/673,889 office action dated May 3, 2018.
Rundberg et al., "An All-Software Thread-Level Data Dependence Speculation System for Multiprocessors", Journa of Instruction Level Parallelism 3, No. 1, 28 pages, Jan. 16, 2002.
U.S. Appl. No. 15/285,555 office action dated Jul. 30, 2018.
European Application # 15872055.7 search report dated Jul. 24, 2018.
Klauser et al., "Selective eager execution on the PolyPath architecture", 25th Annual International Symposium on Computer Architecture, 10 pages, Jul. 1998.
Ahuja et al., "Multipath Execution: Opportunities and Limits", International Conference on Supercomputing, Melbourne, Australia, pp. 101-108, Jul. 13-17, 1998.
European Application # 15872056.5 search report dated Aug. 27, 2018.

\* cited by examiner

| Code in instructions | Dependencies between instructions |
|---|---|
| 1 mov r9, r2 | 1,2,3 depend on 3 from previous iteration |
| 2 ldrb r0, [r2] | 4 depends on 2 |
| 3 strb ip, [r2], #1 | 6 depends on 2 |
| 4 cmp r5, r0 | 3 depends on 6 from previous iteration |
| 5 beq outside_loop | |
| 6 mov ip, r0 | |
| 7 b 1 | |

| Cycles | TH1 | TH2 | TH3 | TH4 |
|---|---|---|---|---|
| 0 | 1/1,1/2,1/3 | | | |
| 1 | | 2/1,2/2 | | |
| 2 | | | | |
| 3 | | | | |
| 4 | 1/4,1/6 | | | |
| 5 | | 2/3,2/4,2/6 | | |
| 6 | | | 3/1,3/2,3/3 | |
| 7 | | | | 4/1,4/2 |
| 8 | | | | |
| 9 | | | | |
| 10 | | | 3/4,3/6 | |
| 11 | | | | 4/3,4/4,4/6 |

Two iterations in 6 cycles (average of 3 cycles/iteration)

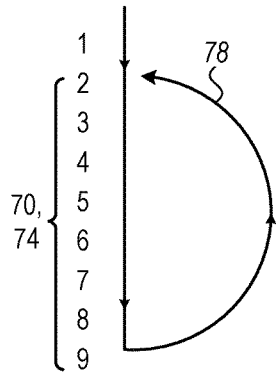 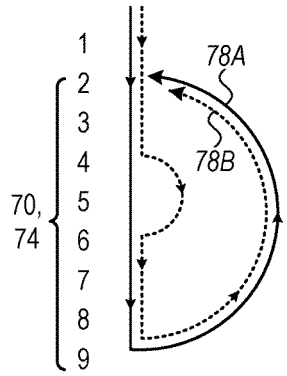 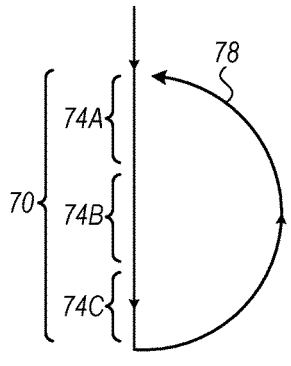
FIG. 3A    FIG. 3B    FIG. 3C
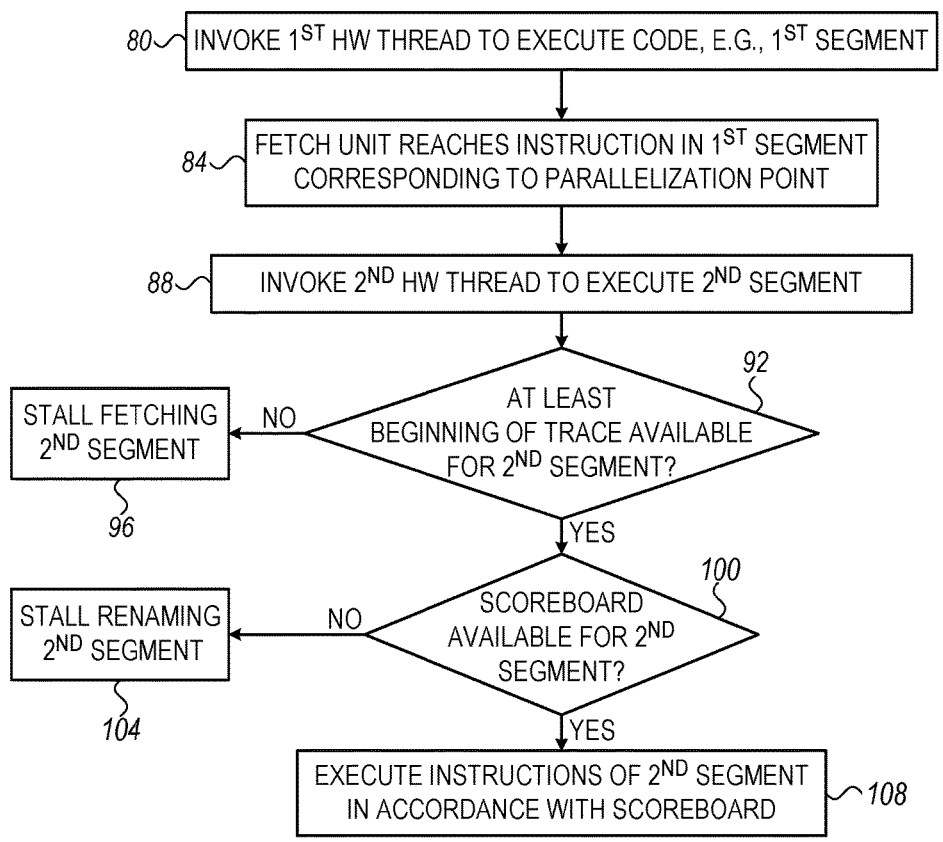
FIG. 4

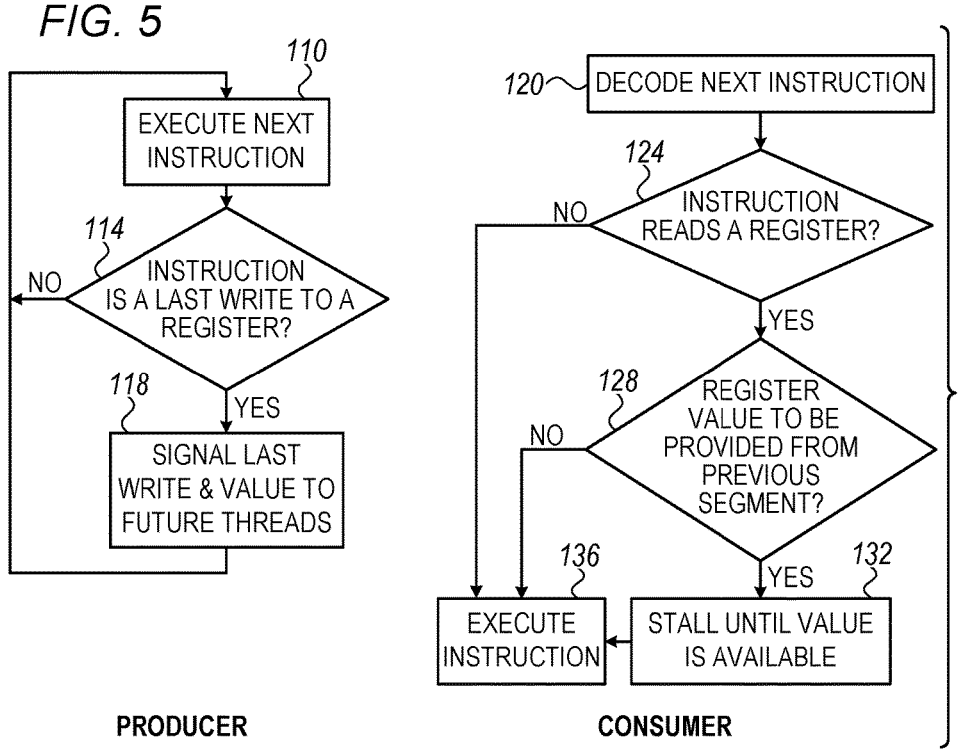

PARALLELIZED EXECUTION OF INSTRUCTION SEQUENCES BASED ON PRE-MONITORING

CROSS-REFERENCE TO RELATED APPLICATIONS

This application is related to a U.S. Patent Application entitled "Parallelized execution of instruction sequences," Ser. No. 14/673,889, filed on even date, whose disclosure is incorporated herein by reference.

FIELD OF THE INVENTION

The present invention relates generally to processor design, and particularly to methods and systems for run-time code parallelization.

BACKGROUND OF THE INVENTION

Various techniques have been proposed for dynamically parallelizing software code at run-time. For example, Akkary and Driscoll describe a processor architecture that enables dynamic multithreading execution of a single program, in "A Dynamic Multithreading Processor," Proceedings of the 31$^{st}$ Annual International Symposium on Microarchitectures, December, 1998, which is incorporated herein by reference.

Marcuellu et al., describe a processor microarchitecture that simultaneously executes multiple threads of control obtained from a single program by means of control speculation techniques that do not require compiler or user support, in "Speculative Multithreaded Processors," Proceedings of the 12$^{th}$ International Conference on Supercomputing, 1998, which is incorporated herein by reference.

Marcuello and Gonzales present a microarchitecture that spawns speculative threads from a single-thread application at run-time, in "Clustered Speculative Multithreaded Processors," Proceedings of the 13$^{th}$ International Conference on Supercomputing, 1999, which is incorporated herein by reference.

In "A Quantitative Assessment of Thread-Level Speculation Techniques," Proceedings of the 14th International Parallel and Distributed Processing Symposium, 2000, which is incorporated herein by reference, Marcuello and Gonzales analyze the benefits of different thread speculation techniques and the impact of value prediction, branch prediction, thread initialization overhead and connectivity among thread units.

Ortiz-Arroyo and Lee describe a multithreading architecture called Dynamic Simultaneous Multithreading (DSMT) that executes multiple threads from a single program on a simultaneous multithreading processor core, in "Dynamic Simultaneous Multithreaded Architecture," Proceedings of the 16$^{th}$ International Conference on Parallel and Distributed Computing Systems (PDCS'03), 2003, which is incorporated herein by reference.

U.S. Patent Application Publication 2014/0282601, whose disclosure is incorporated herein by reference, describes a method for dependency broadcasting through a block-organized source-view data structure. The method includes receiving an incoming instruction sequence using a global front end, and grouping the instructions to form instruction blocks. A plurality of register templates is used to track instruction destinations and instruction sources by populating the register template with block numbers corresponding to the instruction blocks, wherein the block numbers corresponding to the instruction blocks indicate inter-dependencies among the blocks of instructions. A block-organized source-view data structure is populated, wherein the source-view data structure stores sources corresponding to the instruction blocks as recorded by the plurality of register templates. Upon dispatch of one block of the instruction blocks, a number belonging to the one block is broadcast to a column of the source-view data structure that relates to that block, and the column is marked accordingly. The dependency information of remaining instruction blocks is updated in accordance with the broadcast.

SUMMARY OF THE INVENTION

A method includes, in a processor that processes instructions of program code, processing one or more of the instructions by a first hardware thread. Upon detecting that an instruction defined as a parallelization point has been fetched for the first thread, a second hardware thread is invoked to process at least one of the instructions at least partially in parallel with processing of the instructions by the first hardware thread.

In some embodiments, invoking the second thread is performed before the processor begins to resolve dependencies in the instructions processed by the first thread. In an embodiment, detecting the parallelization point includes detecting a backward branch instruction. In another embodiment, detecting the parallelization point includes detecting a function call. In yet another embodiment, the parallelization point is marked with an indication embedded in the program code.

In some embodiments, invoking the second thread includes, upon invoking the second thread, providing to the second thread at least part of a flow-control trace to be traversed in fetching of the instructions for processing by the second thread. In an embodiment, the method further includes selecting the flow-control trace from a set of possible traces using branch prediction. The set of possible traces may be stored in the processor, in a cache of the processor, or in a memory accessed by the processor.

In a disclosed embodiment, the flow-control trace was previously monitored and recorded by the processor during execution of the program code. In another embodiment, invoking the second thread includes stalling the second thread after invocation, until the at least part of the flow-control trace is available. In yet another embodiment, invoking the second thread includes providing only part of the flow-control trace upon invoking the second thread, and providing a remainder of the flow-control trace during processing of the instructions by the second thread.

In still another embodiment, the method further includes processing the instructions by the second thread in accordance with the at least part of the flow-control trace, irrespective of a flow-control prediction provided by a branch-prediction unit of the processor. In an embodiment, the method further includes processing the instructions by the second thread in accordance with a flow-control prediction provided by a branch-prediction unit of the processor, and flushing one or more future segments of the instructions upon detecting a discrepancy between the flow-control prediction and the at least part of the flow-control trace. In another embodiment, the method further includes processing the instructions by the second thread in accordance with the flow-control prediction provided by a branch-prediction unit of the processor, and flushing one or more future segments of the instructions upon detecting a violation of a specification of register access by the instructions.

In some embodiments, the instructions processed by the first and second threads include respective first and second segments of the instructions, and the method includes processing the second segment by the second thread in accordance with a specification of register access that is indicative of data dependencies between the first and second segments. In an embodiment, the specification was produced by the processor during previous processing of the program code. In another embodiment, the specification is provided to the second thread and corresponds to a flow-control trace provided to the second thread.

In yet another embodiment, invoking the second thread includes providing the specification to the second thread after invoking the second thread and before the processor begins to resolve dependencies in the instructions of the second segment. In still another embodiment, invoking the second thread includes stalling the second thread before the processor begins to resolve dependencies in the instructions of the second segment, until the specification is available.

In an embodiment, the method further includes providing the specification to the second thread after the processor resolves dependencies in the instructions of the second segment, and, after providing the specification, verifying that processing of the decoded instructions of the second segment complies with the specification. In another embodiment, processing the second segment in accordance with the specification includes, in response to executing a last write to a register or a flag in the first segment, signaling the last write to one or more threads that process one or more future segments.

In yet another embodiment, processing the second segment based on the specification includes, in response to committing a last write to a register or a flag in the first segment, signaling the last write to one or more threads that process one or more future segments. In an embodiment, processing the second segment based on the specification includes, in response to executing a branch that most recently precedes a last write to a register or a flag in the first segment, signaling the last write to one or more threads that process one or more future segments.

In an example embodiment, the method further includes refraining from invoking the second thread if one or more flags that are set in the first segment are needed as operands in the second segment. In another embodiment, the method further includes identifying, during processing of the second segment, an instruction that uses a value of a register that has not been set in the second segment, and suspending the execution of the instruction until the value is available from a past segment.

In a disclosed embodiment, invoking the second thread includes providing to the second thread at least one predicted value of a register that is written by the first thread and read by the second thread. The method may further include flushing one or more future segments upon detecting a mismatch between the predicted value and an actual value of the register written by the first thread. In an embodiment, the method further includes flushing one or more future segments in response to a branch mis-prediction event in processing of the instructions by the second thread.

In some embodiments, invoking the second thread includes initiating the second thread before the instruction defined as the parallelization point is fetched, and stalling the second thread until detecting that the instruction has been fetched. In an embodiment, the method further includes processing the instructions by the first and second threads in accordance with a same specification of register access that is indicative of data dependencies, and in accordance with a single flow-control trace. In another example embodiment, the method further includes processing the instructions by the first and second threads in accordance with respective different specifications of register access that are indicative of data dependencies, and in accordance with respective different flow-control traces.

In an embodiment, invoking the second thread includes invoking multiple hardware threads to process multiple segments in response to detecting the parallelization point. In another embodiment, invocation of the second thread is permitted only if the first segment is non-speculative. In an alternative embodiment, invocation of the second thread is permitted regardless of whether the first segment is speculative or non-speculative. In an embodiment, hardware threads are invoked to execute segments of the instructions in the order of appearance of the segments in the program code.

There is additionally provided, in accordance with an embodiment of the present invention, a processor including an execution pipeline and parallelization circuitry. The execution pipeline is configured to process instructions of program code. The parallelization circuitry is configured to invoke a first hardware thread to process one or more of the instructions, and upon detecting that an instruction defined as a parallelization point has been fetched by the execution pipeline for the first thread, to invoke a second hardware thread to process at least one of the instructions at least partially in parallel with processing of the instructions by the first hardware thread.

The present invention will be more fully understood from the following detailed description of the embodiments thereof, taken together with the drawings in which:

BRIEF DESCRIPTION OF THE DRAWINGS

FIGS. 3A-3C are diagrams that schematically illustrate code regions containing at least partially repetitive segments, in accordance with embodiments of the present invention;

FIG. 4 is a flow chart that schematically illustrates a method for executing a segment of program instructions, in accordance with an embodiment of the present invention; and FIG. 5 is a flow chart that schematically illustrates a method for exchanging register-access information between segments of program instructions, in accordance with an embodiment of the present invention.

DETAILED DESCRIPTION OF EMBODIMENTS

Overview

Figures 1, 2:
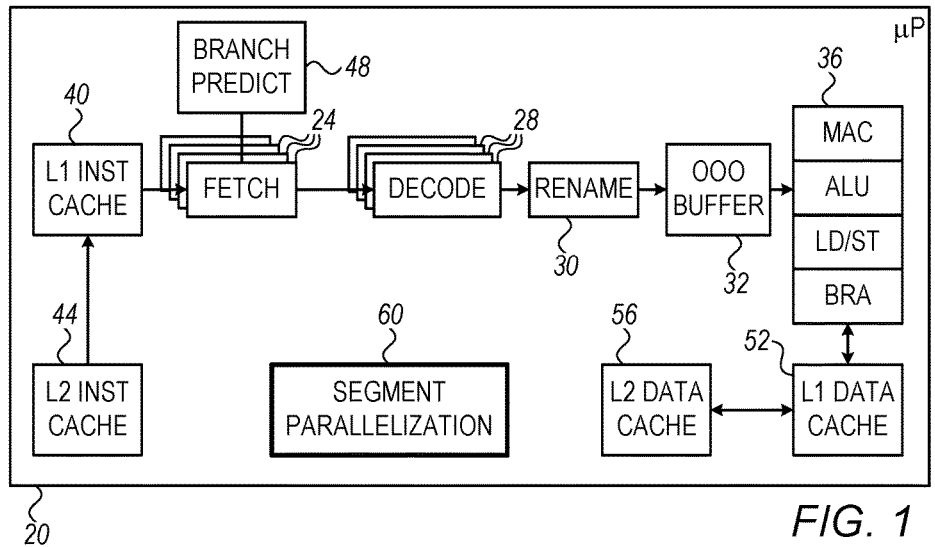
FIG. 1 is a block diagram that schematically illustrates a processor that performs run-time code parallelization, in accordance with an embodiment of the present invention.
FIG. 2 is a diagram that schematically illustrates run-time parallelization of a program loop, in accordance with an embodiment of the present invention.

Embodiments of the present invention that are described herein provide improved methods and devices for run-time parallelization of program code. In some embodiments, a processor comprises an execution pipeline and a parallelization unit. The parallelization unit invokes multiple hardware threads to execute segments of instructions at least partially in parallel. Various examples of segments and parallelization schemes are provided below.

The execution pipeline typically fetches instructions from memory in accordance with a certain branch prediction, decodes the instructions, performs register renaming, schedules the instructions for execution and commits execution results. When parallelizing execution of instructions, it is possible to perform various parallelization functions at various stages of the pipeline. Parallelization performance is strongly affected by this choice.

In some embodiments, the parallelization unit invokes new threads to process segments of instructions, upon reaching locations in the code that are regarded as parallelization points. In particular, in the disclosed embodiments the parallelization unit invokes one or more new threads early in the pipeline—As soon as an instruction corresponding to a parallelization point is fetched.

Parallelization points can be defined in various ways, such as a backward branch instruction in a loop, a function call (e.g., branch with link), or an instruction that is marked in advance in the code. As will be explained below, the parallelization point can also be deduced from a specification that defines access to registers by the instructions in the various segments.

In some embodiments, while a first hardware thread executes certain code instructions, the parallelization unit detects that an instruction corresponding to a parallelization point is fetched. In response to this detection, the parallelization unit invokes a second hardware thread to execute a segment of the instructions at least partially in parallel with execution of the instructions by the first thread. Typically, although not necessarily, from this point the first thread begins to fetch instructions of a first segment, while the second thread begins to fetch instructions of a second segment. Note that, at this stage, the instruction corresponding to the parallelization point may not be decoded yet.

In some embodiments, the parallelization unit holds one or more specifications that define register access by the various segments. Such a specification is referred to herein as a scoreboard. A scoreboard is typically associated with a particular flow-control trace to be followed by the hardware threads when executing the instructions of the segment. The scoreboard of a segment may specify, for example, each register accessed by the instructions in the segment, its classification into one of several types, and an indication of the location in the segment of the last write operation to the register. The location of the last write operation is referred to herein as Last-Write Indication (LWI).

The scoreboard structure and use are addressed in greater detail below, and also in U.S. patent application Ser. Nos. 14/578,516, 14/578,518 and 14/583,119, and U.S. Patent Application Ser. No. 14/637,418, which are all assigned to the assignee of the present patent application and whose disclosures are incorporated herein by reference. In some embodiments, although not necessarily, the parallelization unit also monitors the segments of instructions during execution and constructs the specification.

In some embodiments, the parallelization unit invokes a second thread to process an additional segment as soon as the first thread identifies a parallelization point in the code, or at least before the instruction corresponding to the parallelization point is decoded in a decoding unit of the execution pipeline. In this context, the term "processing an additional segment" refers to any operation of the execution pipeline on instructions of the additional segment, e.g., fetching instructions, feeding instructions for decoding via a loop or trace cache, or any other suitable action.

Such early-stage invocation of the second segment is helpful in reducing latency. On the other hand, in some cases the scoreboard and flow-control trace that the given thread needs in order to execute the segment may not be fully available when the thread is invoked. In some embodiments, the parallelization unit stalls a thread after it is invoked, or delays the invocation, until at least the beginning of the trace is available. A thread may be provided with the beginning of the trace and allowed to run. The remaining part of the trace is provided to the thread later, during execution.

In some embodiments, the parallelization unit may provide a thread with the appropriate scoreboard at any time before the execution pipeline resolves instruction dependencies (e.g., before the renaming stage or before the decoding stage). If the scoreboard is not available at this stage, the thread may still be allowed to run, and the parallelization unit verifies later that the execution does not violate the scoreboard.

Other disclosed embodiments relate to additional execution aspects, such as producer-consumer relationships, signaling of Last-Write Indications (LWIs) between segments, and handling of branch mis-prediction.

System Description

FIG. 1 is a block diagram that schematically illustrates a processor 20, in accordance with an embodiment of the present invention. Processor 20 runs pre-compiled software code, while parallelizing the code execution. Parallelization decisions are performed by the processor at run-time, by analyzing the program instructions as they are fetched from memory and decoded.

In the present example, processor 20 comprises an execution pipeline that comprises one or more fetching units 24, one or more decoding units 28, a renaming unit 30, an Out-of-Order (OOO) buffer 32, and execution units 36. Fetching units 24 fetch program instructions from a multi-level instruction cache memory, which in the present example comprises a Level-1 (L1) instruction cache 40 and a Level-2 (L2) instruction cache 44.

A branch prediction unit 48 predicts the flow-control traces (referred to herein as "traces" for brevity) that are expected to be traversed by the program during execution. The predictions are typically based on the addresses or Program-Counter (PC) values of previous instructions fetched by fetching units 24. Based on the predictions, branch prediction unit 48 instructs fetching units 24 as to which new instructions are to be fetched. The flow-control predictions of unit 48 also affect the parallelization of code execution, as will be explained below.

Decoding units 28 decode the instructions fetched by fetch units 24. Renaming unit 30 performs register renaming on the decoded instructions, in order to resolve register value dependencies. The instructions are then stored in OOO buffer 32, for out-of-order execution by execution units 36, i.e., not in the order in which they have been compiled and stored in memory. Alternatively, the buffered instructions may be executed in-order. The buffered instructions are then issued for execution by the various execution units 36. In the present example, execution units 36 comprise one or more Multiply-Accumulate (MAC) units, one or more Arithmetic Logic Units (ALU), one or more Load/Store units, and a branch execution unit (BRA). Additionally or alternatively, execution units 36 may comprise other suitable types of execution units, for example Floating-Point Units (FPU).

The results produced by execution units 36 are stored in a register file and/or a multi-level data cache memory, which in the present example comprises a Level-1 (L1) data cache 52 and a Level-2 (L2) data cache 56. In some embodiments, L2 data cache memory 56 and L2 instruction cache memory 44 are implemented as separate memory areas in the same physical memory, or simply share the same memory without fixed pre-allocation.

In some embodiments, processor 20 further comprises a segment parallelization unit 60 that is responsible for run-time code parallelization. The functions of unit 60 are explained in detail below.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetch units 24 and multiple decoding units 28. Each hardware thread may comprise a fetch unit assigned to fetch instructions for the thread and a decoding unit assigned to decode the fetched instructions. Additionally or alternatively, multi-threading may be implemented in many other ways, such as using multiple OOO buffers, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements such as reorder buffer (ROB), register renaming, to name just a few. Further alternatively, the disclosed techniques can be carried out with processors having any other suitable micro-architecture.

Generally, fetching units 24, branch prediction unit 48, decoding units 28, renaming unit 30 and execution units 36 may be implemented using any suitable circuitry, and are therefore also referred to herein as fetching circuitry, branch prediction circuitry, decoding circuitry, renaming circuitry and execution circuitry, respectively.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Run-Time Code Parallelization Based on Segment Monitoring

In some embodiments, unit 60 in processor identifies a parallelization point that indicates a region of the code containing one or more code segments that are at least partially repetitive, and parallelizes execution of these code segments. In the context of the present patent application and in the claims, the term "parallelization" refers to both full and partial parallelization, i.e., any execution scheme that is not purely sequential. Such parallelization point may comprise, for example, a backward branch instruction, a function call, or an instruction that is marked in advance with an indication embedded in the code.

In the context of the present patent application and in the claims, the term "segments that are at least partially repetitive" is used in a broad sense and refers to various possible scenarios in which various segments have some commonality, but do not all necessarily perform the exact same sequence of instructions. Several examples of such segments are described in FIGS. 3A-3C below.

Consider, for example, segments that comprise respective iterations of a program loop, or respective executions of a function or procedure. If the loop or function does not contain conditional branch instructions, the segments are typically repetitive, follow the same control-flow trace and perform the same sequence of instructions.

Typically, unit 60 parallelizes the execution of segments even if the segments are only partially-repetitive. Partially-repetitive segments typically have some commonality but do not necessarily follow the exact same control-flow trace. Partially-repetitive segments may, for example, begin at the same instruction and/or end at the same instruction, but otherwise may follow different traces. Examples of this sort include segments that enter or exit a loop or function at different instructions, or segments that take different branches within a loop or function.

As yet another example, unit 60 may divide a repetitive (or partially repetitive) instruction sequence into two or more successive segments, in addition to parallelizing the execution of the sequence as a whole. This collection of segments is also considered as a set of partially-repetitive segments. An example of such a scenario is illustrated in FIG. 3C below.

Further alternatively, unit 60 may identify and parallelize the execution of any other suitable region of code that comprises any other suitable set of partially-repetitive segments. Generally, data values (e.g., register values) and/or flow-control traces may differ from one segment execution to another.

In the disclosed embodiments, processor 20 parallelizes the execution of segments by invoking multiple hardware threads in parallel or semi-parallel. Each thread executes a respective code segment, e.g., a respective iteration of a loop, multiple (not necessarily successive) loop iterations, part of a loop iteration, continuation of a loop, a function or part or continuation thereof, or any other suitable type of segment.

In the example of FIG. 1, although not necessarily, each thread comprises a respective fetch unit 24 and a respective decoding unit 28 that have been assigned by unit 60 to perform one or more segments. In another example embodiment, a given fetch unit 24 is shared between two or more threads.

In practice, data dependencies exist between segments. For example, a calculation performed in a certain loop iteration may depend on the result of a calculation performed in a previous iteration. The ability to parallelize segments depends to a large extent on such data dependencies.

FIG. 2 is a diagram that demonstrates run-time parallelization of a program loop, in accordance with an example embodiment of the present invention. The present example refers to parallelization of instructions, but the disclosed technique can be used in a similar manner for parallelizing micro-ops, as well. The top of the figure shows an example program loop (reproduced from the bzip benchmark of the SPECint test suite) and the dependencies between instructions. Some dependencies are between instructions in the same loop iteration, while others are between an instruction in a given loop iteration and an instruction in a previous iteration.

The bottom of the figure shows how unit 60 parallelizes this loop using four threads TH1 . . . TH4, in accordance with an embodiment of the present invention. The table spans a total of eleven cycles, and lists which instructions of which threads are executed during each cycle. Each instruction is represented by its iteration number and the instruction number within the iteration. For example, "1/4" stands for the 4$^{th}$ instruction of the 1$^{st}$ loop iteration. In this example instructions 5 and 7 are neglected and perfect branch prediction is assumed.

The staggering in execution of the threads is due to data dependencies. For example, thread TH2 cannot execute instructions 2/1 and 2/2 (the first two instructions in the second loop iteration) until cycle 1, because instruction 2/1 (the first instruction in the second iteration) depends on instruction 1/3 (the third instruction of the first iteration). Similar dependencies exist across the table. Overall, this parallelization scheme is able to execute two loop iterations in six cycles, or one iteration every three cycles.

It is important to note that the parallelization shown in FIG. 2 considers only data dependencies between instructions, and does not consider other constraints such as availability of execution units, pipelining issues and other considerations. Therefore, the cycles in FIG. 2 do not necessarily translate directly into respective clock cycles. For example, instructions that are listed in FIG. 2 as executed in a given cycle may actually be executed in more than one clock cycle, because they compete for the same execution units 36.

In some embodiments, unit 60 decides how to parallelize the code by monitoring the instructions in the processor pipeline. In response to identifying a repetitive instruction sequence, unit 60 starts monitoring the sequence as it is fetched, decoded and executed by the processor.

In some implementations, the functionality of unit 60 may be distributed among the multiple hardware threads, such that a given thread can be viewed as monitoring its instructions during execution. Nevertheless, for the sake of clarity, the description that follows assumes that monitoring functions are carried out by unit 60. Unit 60 is also referred to as parallelization circuitry.

In some embodiments, although not necessarily, unit 60 generates the flow-control trace traversed by the monitored instructions, and a monitoring table that is referred to herein as a scoreboard. Alternatively, unit 60 may obtain the trace and/or scoreboard in any other way. For example, the trace and/or scoreboard may be saved in memory and the indication to where they reside in memory may be embedded in the code. The scoreboard of a segment typically comprises some classification of the registers. In addition, for at least some of the registers, the scoreboard indicates the location in the monitored sequence of the last write operation to the register. This indication is referred to herein as a Last-Write Indication (LWI).

Any suitable indication may be used to indicate the location of the last write operation, such as a count of the number of writes to the register or the address of the last write operation. The LWI enables unit to determine, for example, when it is permitted to execute an instruction in a subsequent segment that depends on the value of the register. Additional aspects of scoreboard generation can be found in U.S. patent application Ser. Nos. 14/578,516, 14/578,518 and 14/583,119, and U.S. Patent Application Ser. No. 14/637,418, cited above.

FIGS. 3A-3C are diagrams that schematically illustrate code regions 70 containing at least partially repetitive segments 74 that follow one or more control-flow traces 78, in accordance with embodiments of the present invention. These examples demonstrate several possible types of code regions that can be parallelized.

In FIG. 3A, code region 70 contains a loop having a single type of segment 74 that follows a single internal flow-control trace 78. Thus, the various loop iterations correspond to multiple segments that are entirely repetitive and follow the same trace.

In FIG. 3B, code region 70 contains a loop that has an internal conditional branch. As in the previous example, each loop iteration corresponds to a respective segment 74. In the present example, however, different segments may follow different flow-control traces 78A, 78B, depending on the actual branch decision taken in each segment. In this example the segments are only partially-repetitive, and each of them may have a different scoreboard.

In FIG. 3C, unit 60 divides the loop in code region 70 into multiple successive segment types 74A-74C. Unit 60 may invoke different threads to execute different types of segments within the same loop iteration, in addition to parallelizing the execution of different loop iterations.

In the example of FIG. 3C, the overall loop follows a single trace 78, but different segments types follow different portions of this trace. In other words, segments 74A of various loop iterations are repetitive, as are segments 74B of various loop iterations and segments 74C of various loop iterations. Different segment types, however, follow different traces (each trace having its own scoreboard). This scenario is also considered a set of partially repetitive segments.

Another example scenario may combine the cases of FIGS. 3B and 3C. In such a case, segments 74A, 74B and/or 74C may contain one or more conditional branch instructions. Therefore, segments of a given type may traverse different flow-control traces in various loop iterations. In other words, segments 74A, 74B and/or 74C may be partially-repetitive.

In the example of FIG. 3C, segments 74A, 74B and 74C do not overlap. In alternative embodiments, however, segments 74A, 74B and/or 74C may share one or more overlapping instructions. This case is addressed in greater detail below.

The scenarios of FIGS. 3A-3C above are depicted purely by way of example. In alternative embodiments, unit 60 may parallelize the instructions in any other suitable kind of code region that comprises segments that are at least partially repetitive. In some embodiments, unit 60 monitors various segments separately and combines the monitoring results to produce a scoreboard for the entire code region (e.g., entire loop).

Early-Stage Invocation of Threads

In the disclosed embodiments, parallelization unit 60 parallelizes the execution of instructions by invoking multiple hardware threads to process multiple code segments, at least partially in parallel, in accordance with a scoreboard. In order to execute a given segment, unit 60 typically provides the invoked hardware thread with the appropriate scoreboard, which specifies the dependencies between segments regarding register access. Unit 60 also provides the thread with a flow-control trace to be followed.

In some embodiments, while a first hardware thread executes certain code instructions, parallelization unit 60 detects that fetching unit 24 fetches an instruction corresponding to a parallelization point. Upon detecting this fetch, the parallelization unit invokes a second hardware thread to process a segment of instructions at least partially in parallel with execution of the instructions by the first thread. In a typical example, although not necessarily, the code processed by the first thread comprises a first segment, and the second thread is invoked to process a second segment.

The above process is typically an on-going process. Whenever a thread completes processing a segment, the thread stops fetching instructions, and whenever a thread reaches a parallelization point it invokes a new thread. In a loop, for example, the thread stops fetching the instructions of a segment when the iteration ends, and a thread (possibly the same hardware thread) is invoked to process the next iteration. Alternatively, unit 60 may invoke multiple threads to process multiple segments when the parallelization point has been reached. Generally in processor 20, the threads execute the segments in-order, i.e., in order of appearance of the segments in the program code.

In some embodiments, at any given time the execution pipeline processes multiple segments. One of the segments is regarded as a non-speculative segment, in the sense that the instructions processed in that segment will not be flushed. The other segments are regarded as speculative, in the sense that instructions processed in these segments may possibly be flushed. This process, too, is typically on-going. In a typical flow, a non-speculative segment is completed, a subsequent segment becomes non-speculative, and one or more new segments are invoked. In some embodiments, unit 60 permits invoking new segments only from a non-speculative segment. In other embodiments, unit 60 applies a more aggressive speculation policy, and permits invoking new segments from both speculative and non-speculative segments.

In an embodiment, the parallelization unit may delay invocation of the second thread beyond the parallelization point, for various reasons. For example, the parallelization unit may be aware that the second segment will not start executing immediately, e.g., because of shortage of available hardware resources.

The parallelization point may comprise various kinds of instructions or micro-ops. The parallelization point may comprise, for example, a backward branch instruction, a function call, an instruction that is marked in advance with an indication embedded in the code (for example a dedicated instructions that marks a parallelization point). Such early-stage invocation, even before the instructions of the first thread are decoded, enables fast and efficient parallelization.

At this early stage, however, the flow-control trace and/or scoreboard for the second segment may not be fully available. For example, the monitoring process may still be in progress, and/or may have encountered branch mis-prediction. Thus, in some embodiments unit 60 stalls the invoked second thread until at least part of the flow-control trace is available. Alternatively to invocation followed by stalling, unit 60 may delay the invocation until at least part of the flow-control trace is available.

In some embodiments, the trace (and subsequently a scoreboard) is generated through prediction by branch prediction unit 48. For a set of traces associated with a parallelization point, the branch prediction unit chooses the trace to be provided to the next segment. This prediction mechanism may predict a full trace or a part of a trace (branch after branch). The prediction mechanism may comprise, for example, Most-Recently Used (MRU) prediction, or any other suitable branch prediction scheme.

As soon as at least the beginning of the flow-control trace is available, the second thread is permitted to start fetching. If only part of the trace was provided at the beginning of execution, unit 60 provides the remaining part of the trace as it becomes available. If a thread fetches all the instructions in the partial trace it has been provided with, it will typically stall fetching until a subsequent portion of the trace is provided.

In some embodiments, unit 60 provides the second thread with the scoreboard at any stage between invocation of the second thread and setting of the dependencies between the instructions or micro-ops of the second segment in the pipeline. The dependencies may be set, for example, in renaming unit 30 or in decoding units 28. Thus, the scoreboard may be provided to the second thread at any time before renaming or at any time before decoding.

As with the flow-control trace, the scoreboard may not be fully available at invocation. Typically, if a scoreboard has not yet been provided by the time renaming unit 30 needs to begin renaming the registers of the instructions of the second segment, the second thread is stalled until the scoreboard is available.

FIG. 4 is a flow chart that schematically illustrates a method for executing a segment of program instructions, in accordance with an embodiment of the present invention. The method begins with parallelization unit 60 invoking a first thread to execute certain instructions of the program code, e.g., a first segment of instructions, at a first invocation step 80. At a certain point in time during execution of the first segment, fetching unit 24 begins fetching the instruction corresponding to the parallelization point at a fetching step 84. As soon as this fetching is detected, parallelization unit 60 invokes a second hardware thread to process the second segment, at a second invocation step 88.

At a trace availability checking step 92, unit 60 checks whether at least part of the trace that should be followed by the second thread is available. If not, unit 60 stalls fetching of the instructions of the second segment, at a fetch stalling step 96, until at least the beginning of the trace is available.

At a scoreboard availability checking step 100, unit 60 checks whether the scoreboard to be used by the second thread is available. If not, unit 60 stalls renaming of the registers in the instructions of the second segment, at a rename stalling step 104, until the scoreboard is available. The thread is then allowed to rename, in accordance with the scoreboard, at an execution step 108.

In an alternative embodiment, the second thread may receive the scoreboard and/or trace only after decoding unit 28 started decoding the instructions of the second segment. In this embodiment, the second thread is not stalled but is permitted to execute (with no dependencies). After or during execution, the second thread verifies that the execution so far has not violated the trace and/or the register-access dependencies defined in the scoreboard. Unit 60 may then update the scoreboard with late LWI if necessary. Alternatively, if a violation is found, the second segment may be flushed.

The parallelization schemes described above are depicted purely by way of example. In alternative embodiments, unit 60 may parallelize segments in any other suitable way in response to detecting fetching of the instruction corresponding to the parallelization point.

Some embodiments do not involve a scoreboard and a trace. For example, the first segment may comprise the last iteration of a loop, and the second segment may comprise the instructions following the loop. In such a case, the parallelization point may comprise the last backward branch instruction in the loop. When the trace predictor predicts this was the last iteration, the next segment that may be invoked is the instructions which continue the loop.

As another example, the first segment may comprise the last instructions of a called function, and the second segment may comprise the instructions following return from the function. In such a case, the call instruction serves as the parallelization point. Other embodiments may involve a scoreboard but no trace, such as when the second segment is independent of any preceding instructions.

In some embodiments, the first and second segments are executed using the same scoreboard and the same flow-control trace. In other embodiments, the first and second segments may be executed in accordance with different scoreboards and different traces.

Thread Execution Based on Scoreboard

As explained above, the scoreboard specifies the dependencies between segments with regard to register access. The hardware threads parallelize the execution of segments in accordance with the scoreboard. For a given register, a thread may play the role of a producer and/or a consumer. In the producer role, the thread signals a subsequent thread upon performing the last write to the register. In the consumer role, the thread waits for the signaling that permits it to read the register and from which location. Both roles make use of the Last-Write Indications (LWI) given in the scoreboard.

FIG. 5 is a flow chart that schematically illustrates a method for exchanging register-access information between hardware threads, in accordance with an embodiment of the present invention. The left-hand-side of the figure illustrates the operation of a thread in a producer role, whereas the right-hand-side illustrates the operation of a thread in a consumer role. A given thread often plays both roles simultaneously, i.e., consumes information from one or more previous threads, and produces information for consumption by one or more future threads.

The producer flow begins with a thread executing the next instruction in its segment, in accordance with the provided trace, at a next execution step 110. If the instruction is a write instruction to some register, the thread checks whether the instruction is the last write operation to this register in the segment, at a LWI checking step 114. This information is given in the scoreboard, which was provided to the thread by unit 60.

If the instruction is found to be the last write operation to the register, the thread signals the last write, at a LWI signaling step 118. The thread typically signals the fact that the last write has been performed, and transfers the value written to the register. The method loops back to step 110 in which the thread executes the next instruction in the segment.

At step 118, the LWI signaling and register value are typically provided to one or more other threads that have been invoked to execute subsequent segments of the instruction sequence. Any suitable signaling scheme can be used for this purpose. In an embodiment, the thread may transfer a pointer that points to a location holding the register value, instead of transferring the value itself.

The LWI signaling and value transfer are not necessarily performed only between successive segments. A thread may signal the LWI and transfer the register value to any desired number of threads that are assigned to execute any future segments in the program code. The signaling and value transfer may be performed individually per thread, or using multicast.

In the example flow above, the thread signals the LWI and transfers the register value in response to execution units 36 executing the instruction. In this implementation, if the instruction is later flushed due to mis-prediction, any subsequent segments that proceeded based on this signaling may also need to be flushed.

In an alternative embodiment, the thread signals the LWI and transfers the register value in response to final committal of the instruction. Instead of waiting for committal of the write instruction, it is typically sufficient to wait for committal of the last branch before the write operation, since no mis-prediction is possible at that stage. Such implementations reduce the probability of flushing subsequent segments.

In an embodiment, when constructing the scoreboard over a given segment, parallelization unit 60 identifies the last write operation and generates the LWI by examining the instructions decoded by decoding unit 28. This write operation is then buffered in OOO buffer 32, and may be executed out of order. Nevertheless, the thread executing this segment signals the LWI and transfers the register value upon executing the instruction (either in-order or out-of-order).

The consumer flow begins with a thread decoding the next instruction in the segment, in accordance with the provided trace, at a next decoding step 120. The thread checks whether the instruction reads a register, at a read checking step 124. If not, the thread executes the instruction, at an execution step 136. If the instruction reads a register, the thread checks whether the value of the register in question should have been provided from one or more previous segments, at a value checking step 128. If not, the thread executes the instruction at execution step 136.

If the thread concludes that the value of the register should have been provided from a previous segment, the instruction or micro-op is stalled until the register value is available from execution of a previous segment, at a stalling step 132. The register value becomes available, for example, when another thread has executed a previous segment and has signaled the LWI and transferred the register value (step 108 in the produce flow). Only then, the thread executes the instruction at execution step 126. The consumer flow above is typically repeated per instruction or per micro-op.

In some embodiments, it is not necessary to stall instructions (step 132) at the decoding stage. In some embodiments, the execution pipeline continues to process the segments as far as OOO buffer 32. Only then, the consumer thread waits for the LWI and proceeds to execution once the dependency is resolved.

Note that, in the flows of FIG. 5, the hardware threads execute the instructions while following the flow-control trace provided by unit 60 (which was typically predicted in the branch prediction unit) during the thread invocation, and not according to the "standard" predictions of branch prediction unit 48 which is typically done on a branch-by-branch basis with every instruction being fetched. Alternatively, the threads may follow the "standard" branch prediction, and flush future segments when the branch prediction is different from the trace. Additionally or alternatively, the threads may follow the branch prediction and flush future segments when the scoreboard is violated, i.e., when a data dependency between the first and second segments is violated.

In some embodiments the threads do not perform data-value prediction or speculation. In other words, a thread that depends on a register value from a previous segment will typically stall until this value is available. In other embodiments a thread may predict or speculate register values in order to reduce delay. This solution, however, would increase the likelihood of having to flush instructions.

The producer and consumer flows of FIG. 5 are depicted purely by way of example. In alternative embodiments, transfer of register values may be performed in any other suitable way.

Additional Embodiments and Variations

In some embodiments, processor 20 maintains one or more flags that are used in conditional instructions. Examples of flags include a zero flag ("true" if the result of an arithmetic operation was zero, "false" otherwise), a negative flag ("true" if the result of an arithmetic operation was negative, "false" otherwise), a carry flag ("true" if an addition operation produced a carry, "false" otherwise), an overflow flag ("true" if an addition operation caused an overflow, "false" otherwise), or any other suitable flag. Typically, the flags are implemented as respective bits in a dedicated flags register. The flags are updated by various instructions.

In some embodiments, unit 60 monitors the flags and includes them in the scoreboard in a similar manner to monitoring of registers. For example, unit 60 may determine and record in the scoreboard Last-Write Indications (LWIs) for flags, as well. In this embodiment, a hardware thread acting as producer typically signals the LWI and transfers the flag values upon encountering the last write to a flag. A thread acting as consumer may act upon this signaling, as described in FIG. 5. In other embodiments, unit 60 may decide not to transfer LWI on flags and have a consumer segment stall in case it needs a flag as an operand from a previous segment.

In some embodiments, parallelization unit 60 may handle branch mis-prediction in various ways. In one embodiment, if branch mis-prediction is detected during execution, unit 60 flushes all future segments. In an alternative embodiment, the scoreboard, and execution in general, is based only on instructions that will not be flushed due to branch mis-prediction.

In some embodiments, upon detecting branch mis-prediction, unit 60 corrects the tracking of the scoreboard so as to remove the contribution of instructions that follow the mis-predicted branch and that will be flushed. Correcting the tracking of the scoreboard may involve, for example, decrementing the LWI counters to the proper values before the mis-prediction, or reverting to a previously-saved state of the scoreboard that precedes the mis-prediction.

In some embodiments, as part of the monitoring process unit 60 classifies each register as Global (G), Local (L) or Global-Local (GL), and indicates the classification in the corresponding entry in the scoreboard. In some embodiments this classification is also performed and recorded for the processor flags. The description that follows focuses on registers, for clarity, but the disclosed techniques can be applied to flags, as well. The classification of a register as G, L or GL depends on the order in which the register is used as an operand (whose value is read) and/or as a destination (to which a value is written) in the monitored sequence.

In an embodiment, a local (L) register is defined as a register whose first occurrence in the monitored sequence is as a destination (subsequent occurrences, if any, may be as operand and/or destination). A Global (G) register is defined as a register that is used in the monitored sequence only as an operand, i.e., the register is read but never written to. A global-local (GL) register is defined as a register whose first occurrence in the monitored sequence is as an operand, and is later used in the monitored sequence as a destination. The first and subsequent occurrences may occur in different instructions or in the same instruction, as long as the order between "first" and "subsequent" is preserved.

In some embodiments, unit 60 calculates and uses LWI only for registers classified as GL. In an alternative embodiment, unit 60 calculates and uses LWI for registers classified as GL and for registers classified as L, e.g., in order to support multiple scoreboards. These aspects are addressed in greater detail in U.S. patent application Ser. No. 14/578,518, cited above.

In some embodiments, unit 60 flushes all future segments irrevocably in response to detecting a branch mis-prediction and immediately invokes new threads (without waiting for the parallelization point to be fetched again). In other embodiments, unit 60 invokes new threads only when the thread fetches again the invocation point in the code.

In some embodiments, unit 60 does not invoke new threads when the flags are classified as GL.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a processor that processes instructions of program code by a pipeline comprising at least first and second hardware threads, monitoring at least a first occurrence of a sequence of instructions being processed by the processor, and identifying in the first occurrence of the monitored sequence an instruction that is defined as a parallelization point;

after monitoring the first occurrence, processing one or more of the instructions in a first segment of the instructions, which comprises a second occurrence of the sequence that was monitored, by the first hardware thread;

immediately in response to detecting that a fetch unit in the pipeline has fetched for the first hardware thread a given instruction in the second occurrence of the sequence, before any decoding of the fetched given instruction in the pipeline, identifying, based on the monitoring of the first occurrence of that sequence, that the fetched given instruction is defined as a parallelization point; and in response to identifying that the fetch unit in the pipeline has fetched the given instruction defined as the parallelization point for the first hardware thread, invoking the second hardware thread to process at least one of the instructions of the sequence that was monitored in a second segment of the instructions that has one or more data dependencies with the first segment, wherein processing of the instructions of the second segment is performed at least partially in parallel with processing of the instructions of the first segment by the first hardware thread, in accordance with a specification of register access, which has been constructed by the monitoring and which is indicative of the data dependencies between the first and second segments.

2. The method according to claim 1, wherein the specification was produced by the processor during previous processing of the program code.

3. The method according to claim 1, wherein the specification is provided to the second hardware thread and corresponds to a flow-control trace provided to the second hardware thread.

4. The method according to claim 1, wherein invoking the second hardware thread comprises providing the specification to the second hardware thread after invoking the second hardware thread and before the processor begins to resolve dependencies in the instructions of the second segment.

5. The method according to claim 1, wherein invoking the second hardware thread comprises stalling the second hardware thread before the processor begins to resolve dependencies in the instructions of the second segment, until the specification is available.

6. The method according to claim 1, further comprising providing the specification to the second hardware thread after the processor resolves dependencies in the instructions of the second segment, and, after providing the specification, verifying that processing of the decoded instructions of the second segment complies with the specification.

7. The method according to claim 1, wherein processing the second segment in accordance with the specification comprises, in response to executing a last write to a register or a flag in the first segment, signaling the last write to one or more hardware threads that process one or more future segments.

8. The method according to claim 1, wherein processing the second segment based on the specification comprises, in response to committing a last write to a register or a flag in the first segment, signaling the last write to one or more hardware threads that process one or more future segments.

9. The method according to claim 1, wherein processing the second segment based on the specification comprises, in response to executing a branch that most recently precedes a last write to a register or a flag in the first segment, signaling the last write to one or more hardware threads that process one or more future segments.

10. The method according to claim 1, further comprising refraining from invoking the second hardware thread if one or more flags that are set in the first segment are needed as operands in the second segment.

11. The method according to claim 1, further comprising identifying, during processing of the second segment, an instruction that uses a value of a register that has not been set in the second segment, and suspending the execution of the instruction until the value is available from a past segment.

12. The method according to claim 1, wherein invoking the second hardware thread comprises providing to the second hardware thread at least one predicted value of a register that is written by the first hardware thread and read by the second hardware thread.

13. The method according to claim 12, further comprising flushing one or more future segments upon detecting a mismatch between the predicted value and an actual value of the register written by the first hardware thread.

14. A processor, comprising:
an execution pipeline, which comprises at least first and second hardware threads and which is configured to process instructions of program code; and
parallelization circuitry, which is configured to:
monitor at least a first occurrence of a sequence of instructions being processed by the execution pipeline, and identifying in the first occurrence of the monitored sequence an instruction that is defined as a parallelization point;
after monitoring the first occurrence, invoke the first hardware thread to process one or more of the instructions in a first segment of the instructions, which comprises a second occurrence of the sequence that was monitored;
immediately in response to detecting that a fetch unit in the execution pipeline has fetched for the first hardware thread a given instruction in the second occurrence of the sequence that was monitored, before any decoding of the fetched given instruction in the execution pipeline, identify, based on the monitoring of the first occurrence of that sequence, that the fetched given instruction is defined as a parallelization point; and
in response to identifying that the fetch unit in the execution pipeline has fetched the given instruction defined as the parallelization point for the first hardware thread, invoke the second hardware thread to process at least one of the instructions of the sequence that was monitored in a second segment of the instructions that has one or more data dependencies with the first segment, wherein processing of the instructions of the second segment is performed at least partially in parallel with processing of the instructions of the first segment by the first hardware thread, in accordance with a specification of register access, which has been constructed by the monitoring and which is indicative of the data dependencies between the first and second segments.

15. The processor according to claim 14, wherein the specification was produced by the processor during previous processing of the program code.

16. The processor according to claim 14, wherein the specification is provided to the second hardware thread and corresponds to a flow-control trace provided to the second hardware thread.

17. The processor according to claim 14, wherein the parallelization circuitry is configured to provide the specification to the second hardware thread after invoking the second hardware thread and before the execution pipeline begins to resolve dependencies in the instructions of the second segment.

18. The processor according to claim 14, wherein the parallelization circuitry is configured to stall the second hardware thread before the execution pipeline begins to resolve dependencies in the instructions of the second segment, until the specification is available.

19. The processor according to claim 14, wherein the parallelization circuitry is configured to provide the specification to the second hardware thread after the second hardware thread resolves dependencies in the instructions of the second segment, and, after providing the specification, to verify that processing of the decoded instructions of the second segment complies with the specification.

20. The processor according to claim 14, wherein, in response to executing a last write to a register or a flag in the first segment, the parallelization circuitry is configured to signal the last write to one or more hardware threads that process one or more future segments.

21. The processor according to claim 14, wherein, in response to committing a last write to a register or a flag in the first segment, the parallelization circuitry is configured to signal the last write to one or more hardware threads that process one or more future segments.

22. The processor according to claim 14, wherein, in response to executing a branch that most recently precedes a last write to a register or a flag in the first segment, the parallelization circuitry is configured to signal the last write to one or more hardware threads that process one or more future segments.

23. The processor according to claim 14, wherein the parallelization circuitry is configured to refrain from invoking the second hardware thread if one or more flags that are set in the first segment are needed as operands in the second segment.

24. The processor according to claim 14, wherein the parallelization circuitry is configured to identify, during processing of the second segment, an instruction that uses a value of a register that has not been set in the second segment, and to suspend the execution of the instruction until the value is available from a past segment.

25. The processor according to claim 14, wherein the parallelization circuitry is configured to provide to the second hardware thread at least one predicted value of a register that is written by the first hardware thread and read by the second hardware thread.

26. The processor according to claim 25, wherein the parallelization circuitry is configured to flush one or more future segments upon detecting a mismatch between the predicted value and an actual value of the register evaluated by the first hardware thread.

* * * * *